United States Patent [19]

Proksa et al.

[11] Patent Number: 5,415,540
[45] Date of Patent: May 16, 1995

[54] APPARATUS FOR MANUFACTURING MOLDED PLASTIC ARTICLES OR FOR MANUFACTURING HOLLOW FOAMED ARTICLES

[75] Inventors: Ferdinand Proksa, Leverkusen; Hans-Michael Sulzbach, Königswinter, both of Germany

[73] Assignee: Maschinenfabrik Hennecke, Leverkusen, Germany

[21] Appl. No.: 805,730

[22] Filed: Dec. 9, 1992

[30] Foreign Application Priority Data

Dec. 19, 1990 [DE] Germany .............. 40 40 666.0

[51] Int. Cl.⁶ ............................................. B29C 33/30
[52] U.S. Cl. ................................... 425/183; 425/185
[58] Field of Search .............................. 425/183, 185

[56] References Cited

U.S. PATENT DOCUMENTS

| | | | |
|---|---|---|---|
| 3,621,535 | 11/1971 | Ringdal | 425/185 |
| 3,886,995 | 6/1975 | Bollig et al. | 425/185 X |
| 4,124,345 | 11/1978 | Grunner et al. | 425/183 |
| 4,519,762 | 5/1985 | Ishihara et al. | 425/183 |
| 4,664,614 | 5/1987 | De Rossi | 425/185 |
| 4,691,906 | 9/1987 | Zastrow | 425/183 X |

FOREIGN PATENT DOCUMENTS 3110303 10/1982 Germany .

*Primary Examiner*—Richard L. Chiesa
*Attorney, Agent, or Firm*—Joseph C. Gil

[57] ABSTRACT

In an apparatus for manufacturing molded plastic articles or for manufacturing hollow foamed articles wherein at least two further mold halves are allowed to cooperate alternately with a first mold half, improved accessibility is achieved and a smaller amount of floor space is required by providing a support structure comprising a vertically arranged support axis which has at least one transverse axis on which the further mold halves are pivotably supported by holding devices.

3 Claims, 2 Drawing Sheets

APPARATUS FOR MANUFACTURING MOLDED PLASTIC ARTICLES OR FOR MANUFACTURING HOLLOW FOAMED ARTICLES

BACKGROUND OF THE INVENTION

The invention relates to an apparatus for manufacturing molded plastic articles or for manufacturing hollow foamed articles, comprising a closing unit with a first mold half and at least two further mold halves which are disposed on a support structure and are alternately movable either in the closing direction simultaneously with the first mold half or into the closed position above the first mold half.

German patent 3,110,303 discloses a process and an apparatus for manufacturing multilayer molded articles from at least two polyurethane systems, wherein at least two different upper mold halves are successively associated with a lower mold half to form the various layers. The two upper mold halves are disposed at an angle of 90° on a support body which is rotatable about an axis inclined at an angle of 45° to the horizontal. The axis is supported in a vertically displaceable holding device so that the upper mold half lying in working position may be lowered onto the lower mold half. After closure and injection of the first reaction mixture, the holding device of the axis is raised again and the form tool is opened. The support body is swivelled 180° about the inclined axis so that the second upper mold half is positioned over the lower mold half. After closure of the form tool, the second reaction mixture is introduced. This type of changeover apparatus for the upper mold half is very expensive and, because of the inclined axis, the power usage is very high. The construction is also very difficult to access for maintenance work or for exchanging the upper mold halves. German Patent 2,724,929 describes a similar apparatus.

German Patent 3,530,831 discloses an apparatus for producing refrigerator cabinets. In the apparatus described, a transverse axis is disposed with clearance above a lower support mold half. A support body having a plurality of different upper support mold halves in the form of cores is supported and is rotatable about the axis. While the outer geometry of various refrigerator cabinets is frequently identical, the inner geometry generally varies. Thus, to change the inner geometry, the appropriate support core is used as an upper mold half while the support body is suitably rotated until the appropriate support core is positioned in the closing direction. This apparatus also has the drawback that the upper mold halves are difficult to access for maintenance work and for exchange operations.

The object of the present invention was the design of the above type of apparatuses in such a way that the alternately usable mold halves, as a result of being more accessible, are easier to maintain and exchange and in such a way as to require a smaller amount of floor space.

DESCRIPTION OF THE PREFERRED EMBODIMENTS

Figure 1:
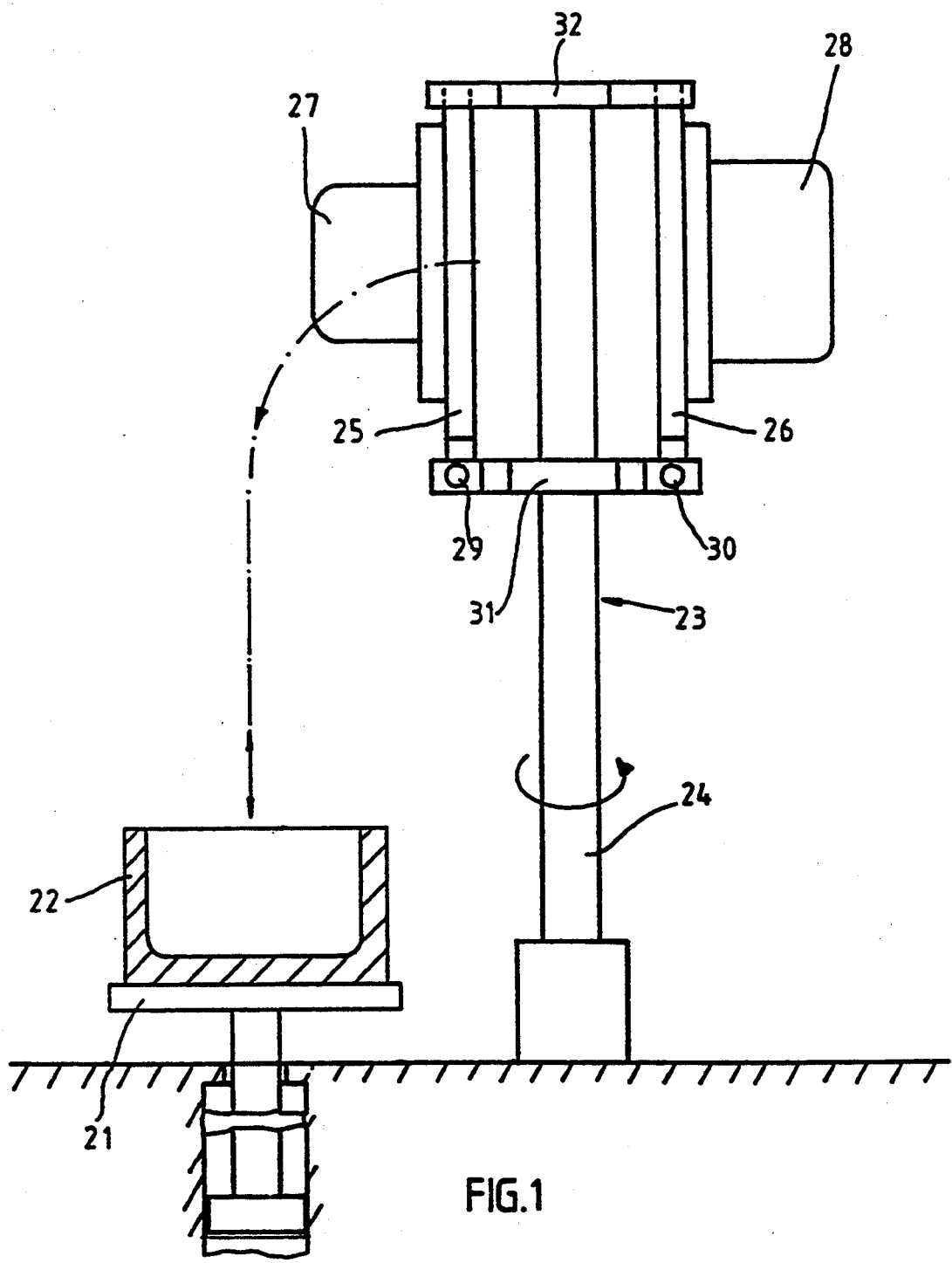
FIG. 1 is a side view of a first embodiment.

The above object was achieved in that the support structure comprises a rotatable support axis which is disposed in a vertical position parallel to the closing direction and has at least one transverse axis. The mold halves are pivotably supported on the transverse axis by holding devices.

In one embodiment, the holding devices preferably consist of clamping plates which can be pivoted about the transverse axis. The effect thereby achieved is that the mold half not in use takes up less or no additional floor space. To maintain or exchange the mold halves, they may be pivoted downwards, and, because of the rotatability of the support axis, they may be temporarily brought into a desirable free position away from the area of the lower mold half, so that the floor space required is only periodically in use.

The support axis is preferably capable of telescopic extension. In this manner, both mold halves may be moved towards one another rather than the lower mold half having to be moved towards the second mold half for closure of the form tool.

Two embodiments of the new apparatus are illustrated purely diagrammatically in the drawings and are described in greater detail hereinafter, with all non-essential or self-evident details being omitted for the sake of greater clarity.

In FIG. 1, the apparatus comprises a) a liftable clamping plate 21 with a lower mold half 22, as well as b) a support structure 23 which in turn comprises a support axis 24 on which holding devices 25, 26 for two mold halves 27, 28 are disposed. The holding devices 25, 26 in the form of clamping plates are supported by means of transverse axes 29, 30 in cross members 31 (only the front one is visible) and are secured in an upright position, on cross members 32 (only the front one is visible). The mold half 27 may, by folding down through 90°, be brought into closed position. The other mold half 28 may be brought into closed position by rotating the support axis 24 through 180°.

Figure 2:
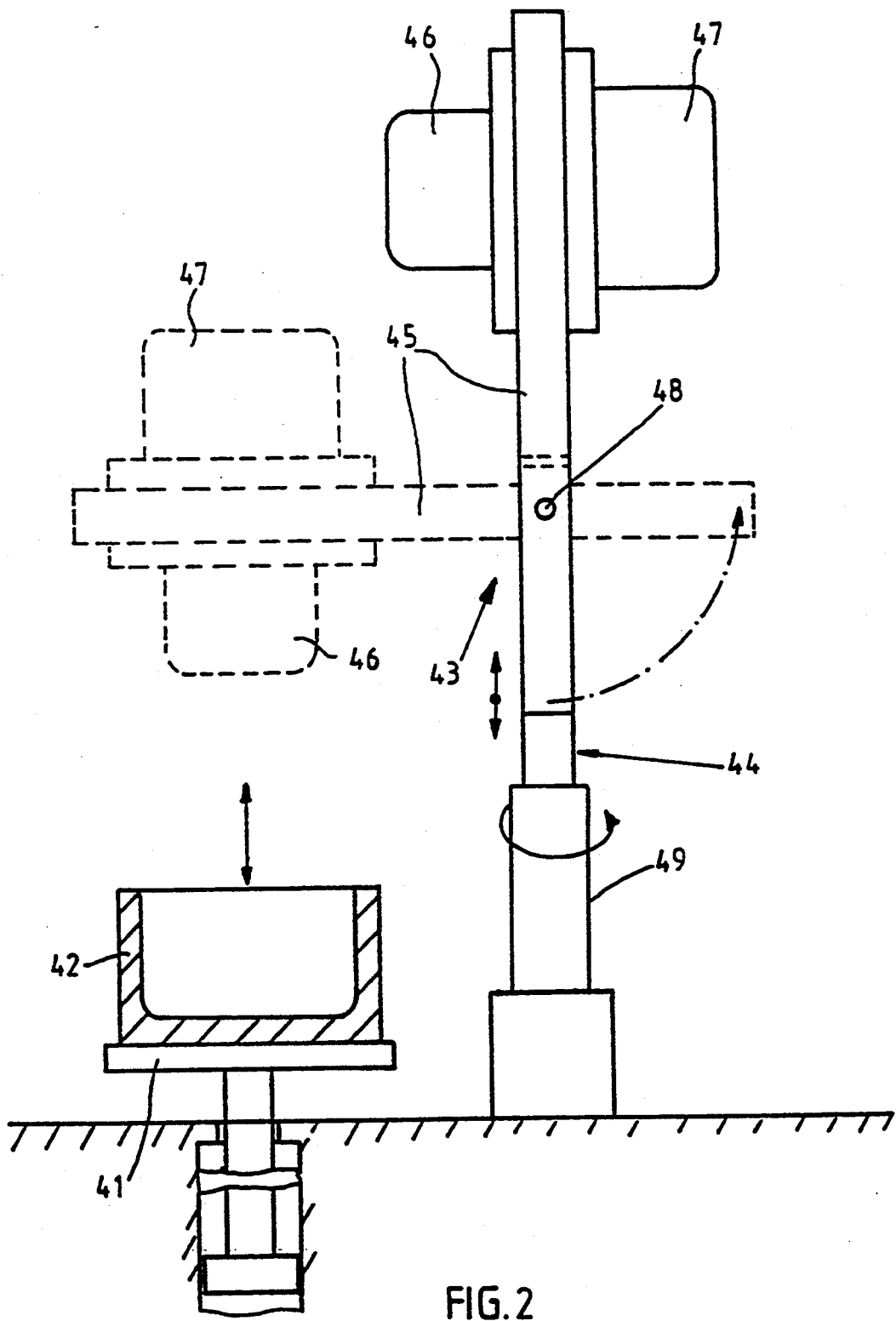
FIG. 2 is a side view of a second embodiment.

According to FIG. 2, the apparatus comprises a) a liftable clamping plate 41 with a lower mold half 42, as well as b) a support structure 43 which in turn comprises a support axis 44 with a holding device 45 for two mold halves 46, 47. The holding device 45 comprises a clamping plate supported in a hinged manner about a transverse axis 48 disposed on the support axis 44. The dashed-line illustration of the clamping plate 45 and mold halves 46, 47 shows the position in closing direction prior to the mold-filling process. The support axis 44 consists of telescopically extendable sections 49.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. An apparatus for manufacturing plastic molded articles or for manufacturing hollow foamed articles, comprising
    a) a first mold half mounted on a movable mounting plate,
    b) at least two further mold halves mounted on a support structure, with said support structure allowing movement of the at least two further mold halves in a first direction towards said first mold half and in a second direction away from said first mold half, wherein
    c) said support structure comprises a vertically disposed, rotatable support member which defines a vertically disposed axis and at least one transverse member carried by said support member, which transverse member defines an axis transverse to said vertically disposed axis, and wherein the at least two further mold halves are pivotably supported on said transverse member by means of holding devices.

2. The apparatus of claim 1, wherein said holding devices consist of clamping plates which can be swiveled about said transverse axis.

3. The apparatus of claim 1, wherein said support member is capable of telescopic extension.

* * * * *